United States Patent
Verdugo et al.

(10) Patent No.: US 9,114,949 B2
(45) Date of Patent: Aug. 25, 2015

(54) MONITORING A MEDIA ROLL MOUNTED IN A PRINTING APPARATUS

(71) Applicant: Hewlett-Packard Development Company, L.P., Houston, TX (US)

(72) Inventors: Antonio Gracia Verdugo, Barcelona (ES); Marta Coma Vives, Barcelona (ES); Mauricio Seras Franzoso, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 13/920,573

(22) Filed: Jun. 18, 2013

(65) Prior Publication Data

US 2014/0367508 A1    Dec. 18, 2014

(51) Int. Cl.

| | |
|---|---|
| *B41J 29/48* | (2006.01) |
| *B65H 26/08* | (2006.01) |
| *G01B 11/08* | (2006.01) |
| *G01B 11/12* | (2006.01) |
| *B65H 23/04* | (2006.01) |
| *B41J 11/00* | (2006.01) |

(52) U.S. Cl.
CPC ........... *B65H 23/046* (2013.01); *B41J 11/0075* (2013.01); *B41J 29/48* (2013.01); *B65H 26/08* (2013.01); *G01B 11/08* (2013.01); *G01B 11/12* (2013.01)

(58) Field of Classification Search
CPC ..................... B65H 26/08; B65H 2301/41522; G01B 11/08; G01B 11/105; B41J 29/48; B41J 11/0075
See application file for complete search history.

(56) References Cited

U.S. PATENT DOCUMENTS

| | | | | |
|---|---|---|---|---|
| 5,428,557 | A  * | 6/1995 | Harbaugh et al. | 702/163 |
| 7,793,017 | B2 * | 9/2010 | Gehring et al. | 710/63 |
| 8,240,928 | B2 | 8/2012 | Tsugaru et al. | |
| 8,272,795 | B2 | 9/2012 | Tanabe et al. | |
| 2009/0095106 | A1* | 4/2009 | Hollender et al. | 74/425 |
| 2009/0226235 | A1* | 9/2009 | Kobayashi et al. | 400/614 |
| 2012/0055272 | A1* | 3/2012 | Sanada et al. | 73/865.8 |
| 2013/0050681 | A1* | 2/2013 | Miller et al. | 356/72 |

FOREIGN PATENT DOCUMENTS

| | | | | | |
|---|---|---|---|---|---|
| CN | 202608264 | U  * | 12/2012 | | B41J 15/04 |
| JP | 53069072 | A  * | 6/1978 | | G01B 11/08 |
| JP | 53118071 | A  * | 10/1978 | | G01B 5/08 |
| JP | 61003750 | A  * | 1/1986 | | B41J 3/04 |
| JP | 07098220 | A  * | 4/1995 | | G01B 21/10 |
| JP | 2005014250 | A  * | 1/2005 | | B41J 15/04 |

OTHER PUBLICATIONS

Star MICRONICS ICS Co., Ltd., Product Specifications Manual—TUP900 Series, Mar. 12, 2003.*

* cited by examiner

*Primary Examiner* — Daniel J Colilla
(74) *Attorney, Agent, or Firm* — Hewlett-Packard Legal Department

(57) ABSTRACT

A method to monitor a media roll mounted in a printing apparatus comprises scanning with a sensor an end side of a media roll by displacing the sensor in the radial direction of the roll, detecting the position of a media roll outer edge during said scanning, and determining a dimension of the media roll on the basis of the detected outer edge position.

18 Claims, 5 Drawing Sheets

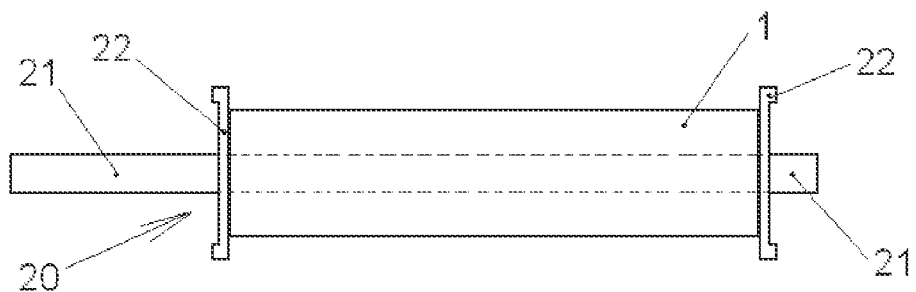
FIG. 2
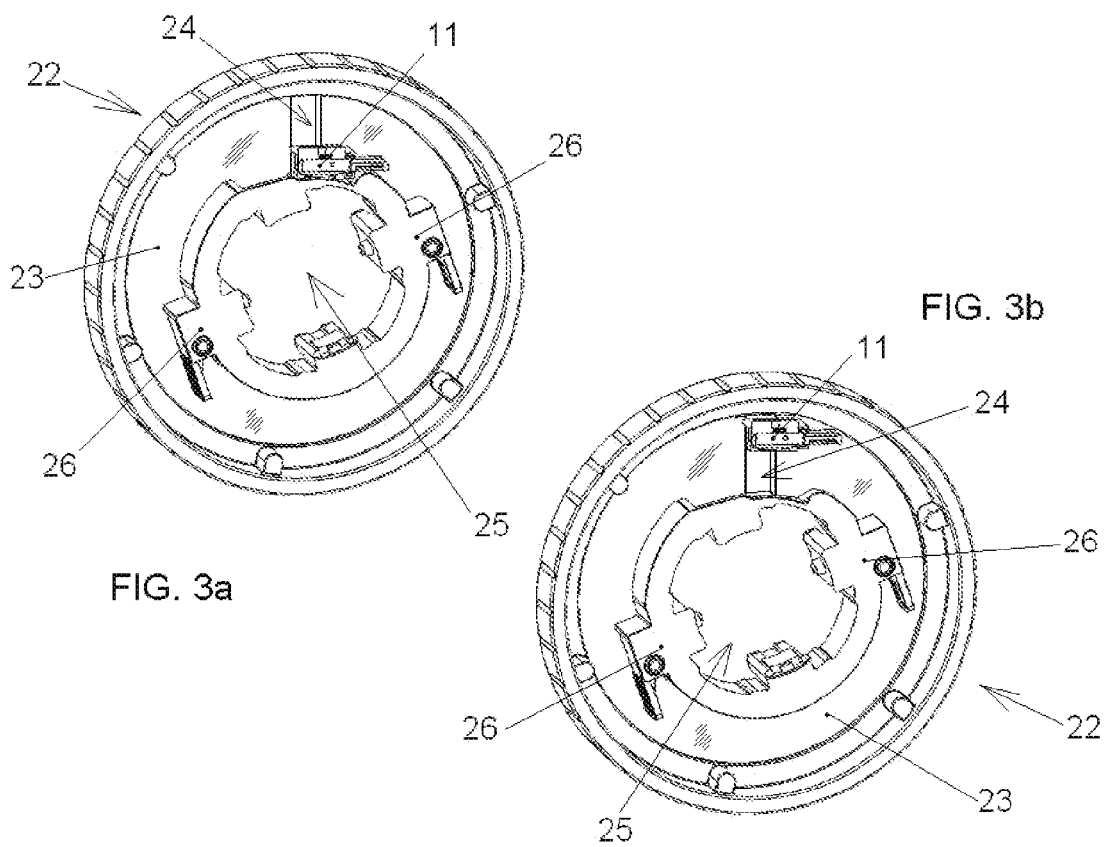
FIG. 3a
FIG. 3b

MONITORING A MEDIA ROLL MOUNTED IN A PRINTING APPARATUS

BACKGROUND

Some known printing apparatus employ a print media, such as paper, which is fed from a media roll. Such a media roll may comprise a core, for example a hollow cardboard cylinder, around which a web of print media is wound. The roll may be mounted on a spindle so as to be able to rotate, and media may be unwound from the media roll and advanced through the printing apparatus as needed.

It is an advantage for the users of a printing apparatus that a dimension of a media roll, e.g. the length of media remaining on the media roll, may be known or monitored.

For example this may allow checking whether the remaining media is sufficient to complete a certain print job before the job is started, thereby avoiding a waste of print media, printing pigment, user time, etc.

BRIEF DESCRIPTION

Figure 1:
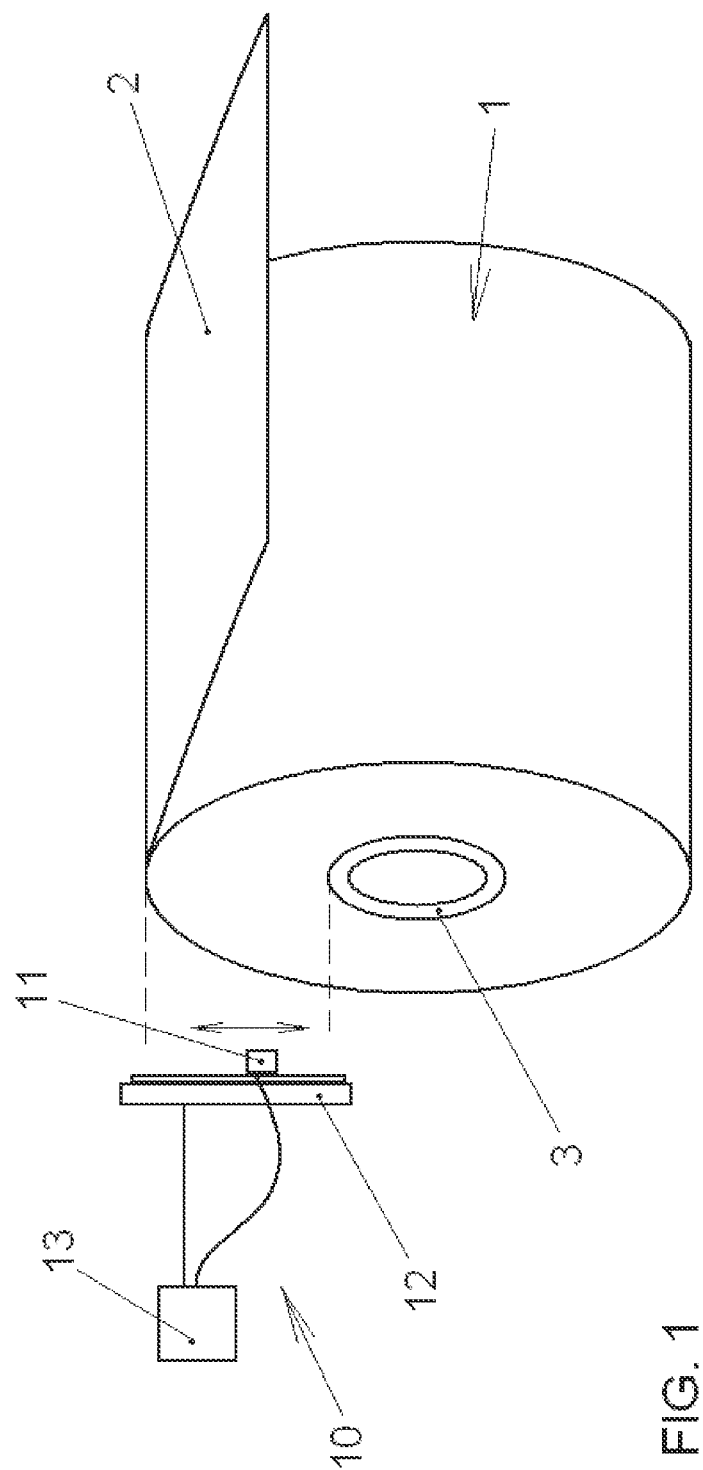
Figure 4:
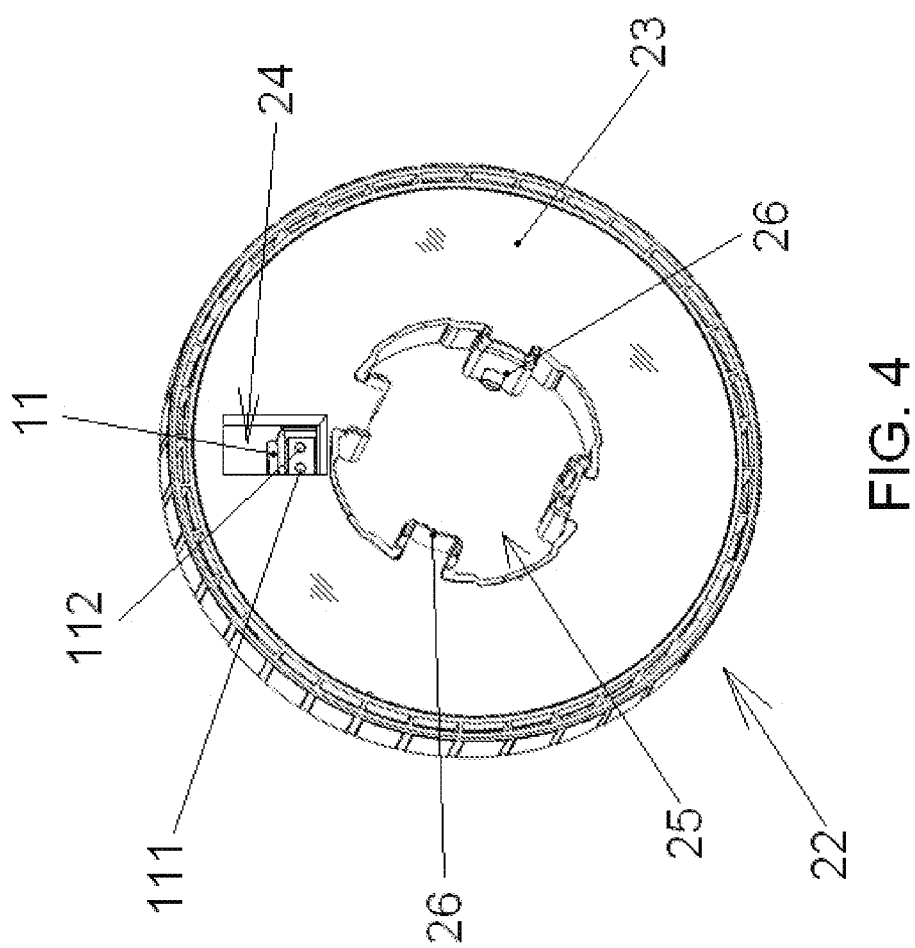
Figure 5:
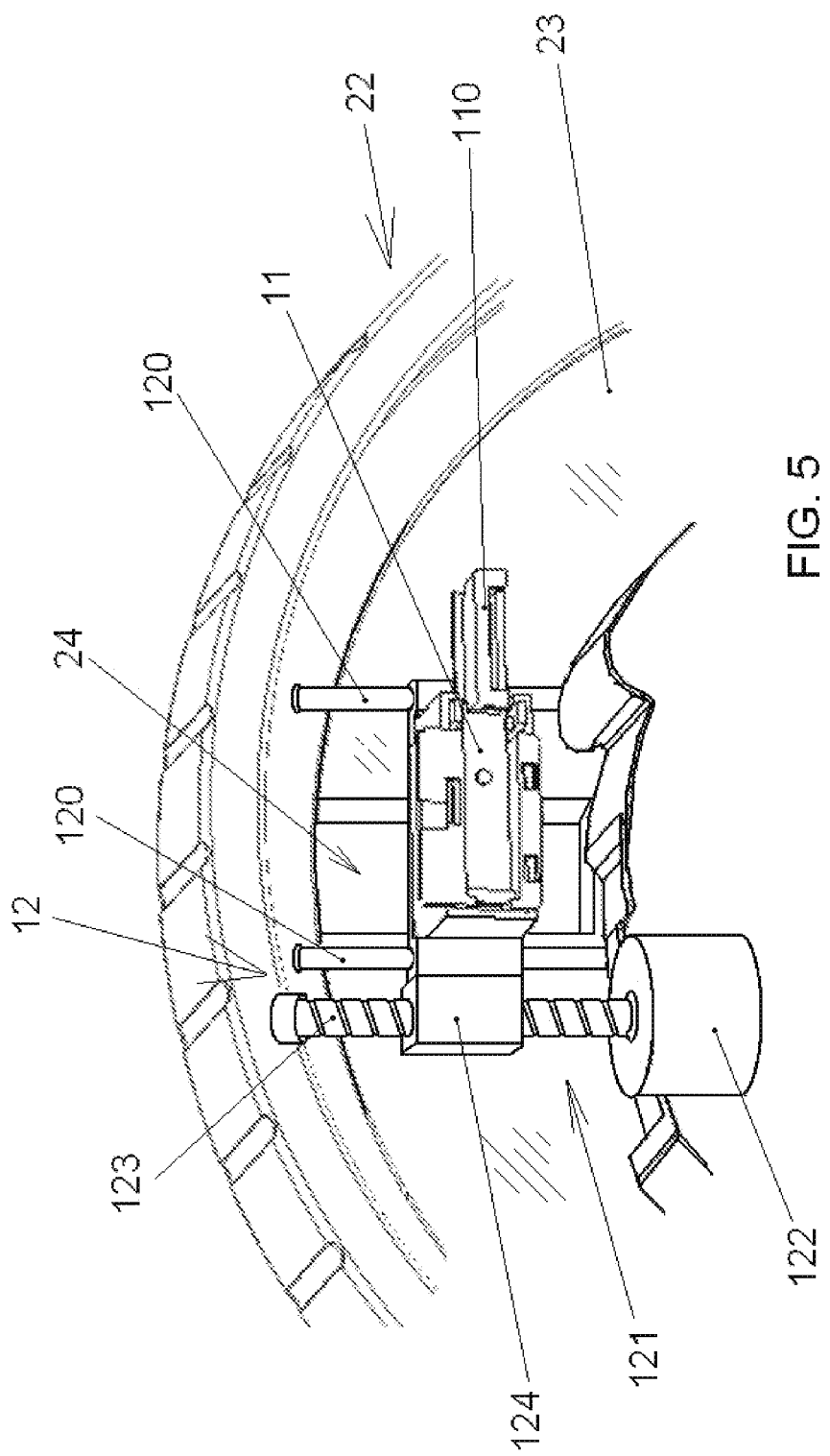
Figure 6:
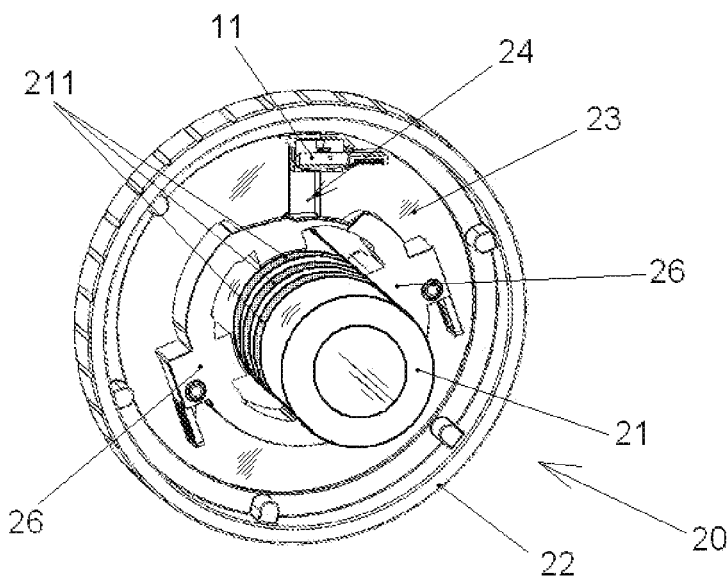
Figure 7:
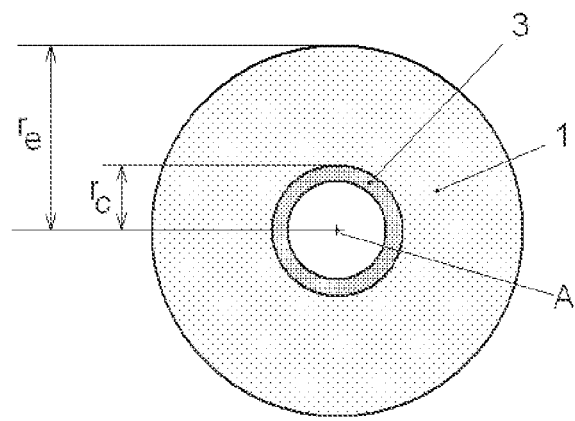
Figure 8:
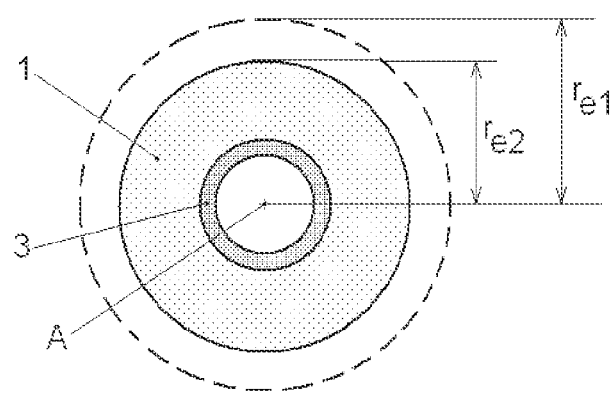

Some non-limiting examples of devices which may be employed to monitor a media roll mounted in a printing apparatus will be described in the following with reference to the appended drawings, in which:

FIG. 1 schematically shows an example of a device, as described herein, to monitor a media roll that is mounted in a printing apparatus;

FIG. 2 schematically shows a media roll support on which a device to monitor the media roll may be mounted;

FIGS. 3a and 3b schematically show an example of a device mounted on a media roll holder to monitor the media roll, in two different positions;

FIG. 4 schematically shows the device of FIGS. 3a and 3b, from another side;

FIG. 5 schematically shows an enlarged view of an example of a device to monitor a media roll;

FIG. 6 schematically shows an example of a device to monitor a media roll, as described herein, mounted on a media roll support with a spindle; and FIGS. 7 and 8 are diagrams schematically illustrating the geometry and dimension features of a media roll.

DETAILED DESCRIPTION

In some printers the control unit may monitor the amount of media that advances through the printer, and may therefore estimate the amount of remaining media in the roll if the initial amount is known.

However, especially in large format printers, media rolls may need to be loaded and unloaded several times from the printer, depending on the jobs to be printed: for example a first media roll that has been only partly consumed may be removed from the printer to load a second media roll with a different kind of print media, which is needed for a specific job; later the first media roll may be again loaded in the printer for other print jobs.

In such cases the printer controller is unable to keep track of the media available in the roll that is being used.

Some solutions have been proposed to solve this problem, such as printing barcodes on the media before removing the roll to provide information regarding the remaining media, and scanning the barcode when the roll is loaded again in the printer. However this may lead to a significant amount of time being lost in the process of printing the barcodes before the media roll can be removed.

Another dimension of a media roll that it may be interesting to know or monitor is the thickness of the media, especially in printing operations in which heat is applied (e.g. drying/curing), since the deformation of the media depends on its thickness.

A media roll 1 (FIG. 1) comprises print media 2 wound around an inner core 3, such that it forms a media annulus. In FIG. 1 the media roll 1 is shown as it may be positioned when mounted e.g. on a media roll support such as that of FIG. 2, in a printing apparatus.

Also schematically shown in FIG. 1 is a device 10 to monitor the media roll according to an example described herein, which may be arranged adjacent one end side of the media roll 1 and may comprise a sensor 11 and a driving assembly 12 to displace the sensor 11 in the radial direction along a in displacement path, a shown by the arrow in FIG. 1, allowing the sensor to scan the end side of the roll.

The monitoring device 10 may also comprise a sensor control unit 13, connected to the sensor 1 and to the sensor driving assembly 12, to control is displacement and scanning of the sensor, and to determine from the sensor output the position of the media roll outer edge.

Examples of a monitoring device 10 such as disclosed herein allow determining the position of the media roll outer edge at any time while the media roll is in use in a printing apparatus. Using this information the media roll may be monitored during use to determine, for example, the length of media remaining on the roll, or the thickness of the media, as will be explained later on.

In examples shown herein, the displacement path of the sensor 11 in the radial direction may extend at least between the outermost position of a media roll outer edge, which is related to the maximum dimension of the media roll 1, and the innermost position of the media roll outer edge (i.e. the position of the outer edge when the media is almost all unwound from the roll), which is substantially coincident with the position of the media roll core 3. These outermost and innermost positions are shown in FIG. 1 in dashed lines.

The path may also extend at least slightly past the innermost position of the media roll outer edge towards the centre of the media roll, to allow determining the position of the media roll core 3. By "position of the media roll core" it is meant the position of the outer surface of the core 3, which is in contact with the media.

Examples of a monitoring device as disclosed herein may be mounted on a media roll support such as support 20 schematically shown in FIG. 2. As shown in this figure, such a support may comprise a spindle 21 on which a media roll 1 may be arranged, and a media roll holder 22 may be mounted on the spindle 21 at each side of the media roll, to maintain the roll in place on the spindle.

FIGS. 3a, 3b and 4 show in more detail an example of a media roll holder 22. As shown, in some examples the holder 22 may comprise a plate 23 with one side (visible in FIG. 4) facing the media roll 1 and another side (visible in FIGS. 3a and 3b) facing away from the media roll 1.

FIGS. 3a and 3b show the sensor in two different positions of the displacement path, while FIG. 4 shows the sensor 11 in the position of FIG. 3a, but as visible from the side of the plate 23 facing the media roll.

In some examples, such as shown in FIGS. 3a, 3b and 4, the sensor 11 may be mounted on the side of the plate 23 facing away from the media roll, such that it does not hinder the positioning function of the holder 22.

The plate 23 may comprise an opening 24 in correspondence with the displacement path of the sensor 11, such that the sensor 11 may "see" the media roll.

The holder 22 may further comprise an axial opening 25 to slide the holder on the spindle 21, and clamping elements 26 to lock the holder 22 in an appropriate position along the spindle 21.

Examples of the sensor driving arrangement 12 may comprise, as shown in the enlarged view of FIG. 5, guiding rods 120 attached to the holder 22 to guide the displacement of the sensor 11, and a suitable drive 121 such as comprising a stepper motor 122, a lead screw 123 rotated by the motor and a travelling nut 124 attached to the sensor 11.

The sensor 11 may include a connector 110 for data and power supply.

In some examples the sensor may be a line sensor, and in some examples it may comprise a LED emitter 111 and a photo transistor detector 112, as schematically indicated in FIG. 4.

In examples of a media roll support such as disclosed, the monitoring device may also comprise a sensor control unit, such as control unit 13 of FIG. 1, which may also be mounted on the media roll holder 22 and connected to the sensor and to the sensor driving assembly. A display and/or keyboard, or other input and/or output devices, may also be provided on the media roll support, as well as a power supply such as a battery.

In other examples, the media roll support may be provided with releasable electric connections to a sensor control unit which is remote from or external to the media roll support, for example integrated in the printing apparatus controller. Releasable electric connections to external input and/or output devices as well as a power supply may also be foreseen.

For example, the spindle 21 may comprise circumferential conductive tracks 211 as shown in FIG. 6, which schematically shows an example of a media roll support 20 with a holder 22 fixed to a spindle 21 by clamps 26 (only the end of the spindle 21 projecting from the holder is shown). Cables with a suitable connector may be provided between the conductive tracks 211 and the sensor 11 and sensor driving assembly 12, in order to allow separating the holder 22 from the spindle 21.

Circumferential conductive tracks may be also arranged on the media roll holder 22, by providing the holder with an axial portion (not shown) surrounding the spindle 21 and bearing the circumferential conductive tracks.

When circumferential tracks are provided on the holder 22 or spindle 21, and therefore rotate with the media roll, electric brushes may be provided on the printing apparatus to provide releasable and sliding electrical contact between the conductive tracks and a stationary control unit and/or power supply.

Turning now to FIG. 7, examples of a method to monitor a media roll mounted in a printing apparatus will be described. This figure schematically shows a media roll 1 with a core 3, as seen from an end side of the roll.

According to some examples, a method to monitor a media roll 1 mounted in a printing apparatus may comprise scanning with a sensor, such as a sensor 11 as described above, the end side of the media roll 1, by displacing the sensor in the radial direction of the roll 1, and detecting, during said scanning, the position of the media roll outer edge. On the basis of this detected position, a dimension of the media roll may be determined.

In some examples, a radial dimension of the media roll may be determined on the basis of the detected outer edge position: for example the radius $r_e$ of the media roll at the outer edge, i.e. the distance between the centre or axis A of the roll and the outer edge (FIG. 7). The position of the axis A may be set as a reference for the sensor.

In some examples, a further radial dimension of the media roll may be determined, on the basis of the position of the media roll core 3: for example, the radius $r_c$ at the roll core, i.e. the distance between the centre or axis A of the roll and the outer surface of the core 3 (FIG. 7).

Like in the case of the position of the outer edge of the media roll, the position of the media roll core 3 may be detected by scanning with the sensor the end side of the media roll, in the radial direction; however, since the radius $r_c$ and the position of the roll core 3 do not change during printing, they may also be known from earlier measurements, or from the media roll specifications.

Examples of methods disclosed herein may further comprise determining the length L of media remaining on the media roll 1; in some examples, this length may be determined on the basis of the radial dimensions $r_e$ and $r_c$ of the media roll, and on the thickness t of the media.

In such cases, the length L of media remaining on the media roll 1 may be determined with the following equation:

$$L = \pi \frac{r_e^2 - r_c^2}{t}$$

The thickness t of the media may be known from the information provided by the manufacturer on the media roll itself, but it may also be determined when the media roll is loaded in a printing apparatus, as will be explained later on.

Many printing apparatus allow monitoring the length of media that is advanced and/or moved back through the printer: in such apparatus, once the length of remaining media is determined at a given time, this length may be subsequently monitored e.g. by the printer controller. Thus, according to examples of the method, at any given time during printing the length of media L remaining on the media roll may be determined on the basis of a previously determined length of media $L_o$ remaining on the media roll and the length of media $L_a$ that has been subsequently advanced through the printing apparatus, $L=L_o-L_a$.

As explained, examples of the method may therefore allow determining automatically the length of media remaining on a media roll when the roll is loaded in a printing apparatus, and/or at any time during subsequent printing operations.

Consequently, and since a printing apparatus may determine the length of media $L_j$ required for a certain print job, some examples of the method may further comprise comparing the length of media L remaining on the media roll 1 with the media length $L_j$ required for a pending print job.

The controller may stop printing and/or may generate a warning signal, in case $L<L_j$, so as to avoid printing an incomplete plot and thus wasting time, media and printing fluid.

Depending on the desired mode of operation, this check or comparison may be done automatically before every print job, or may be requested by the user, e.g. before a print job is sent.

Examples of the method also allow determining the thickness t of the media that is wound on the media roll 1, as will be explained with reference to FIG. 8, which is similar to FIG. 7.

In FIG. 8, the dashed line shows the media roll 1 with a first length of media wound thereon, and the outer edge of the media roll in a corresponding first position; the solid line shows the media roll 1 after some of the media has been unwound from the roll, and the outer edge of the media roll in a corresponding second position. As will be understood, the difference between the first position and the second position of the outer edge of the media roll is related to the length of media $L_a$ advanced between the two positions, and the thickness t of the media.

Consequently, in examples of the method, the thickness of the media may be determined by:
performing a first scanning operation to detect a first position of the media roll outer edge (dashed line in FIG. 8), and determining a first radial dimension of the roll, e.g. radius $r_{e1}$,
advancing a length of media $L_a$ through the printing apparatus,
performing a second scanning operation to detect a second position of the media roll outer edge (solid line in FIG. 8), and determining a second radial dimension of the roll, e.g. radius $r_{e2}$, and
determining the thickness of the media, as:

$$t = \pi \frac{r_{e1}^2 - r_{e2}^2}{L_a}$$

The length of media $L_a$ that is advanced between the two scanning operations may be controlled the printing apparatus controller.

Such examples of the method may be carried out at any time, either automatically or under request of the user. For example, they may be performed automatically during the media roll loading operations, taking advantage of the media movements caused by the printing apparatus controller; this allows determining or verifying the media thickness as soon as the roll is loaded, and have it available for any subsequent determinations.

A higher or lower degree of accuracy may be achieved in the determination of the thickness of the media, of the remaining length of media, or of other media roll dimensions, depending on the resolution of the sensor and the thickness of the media.

In some examples, a difference of about two turns of media on the roll may be detected, if the media on the media roll has a thickness of about 100 μm.

Although only a number of particular embodiments and examples have been disclosed herein, further variants and modifications of the disclosed print media products are possible; other combinations of the features of embodiments or examples described are also possible.

The invention claimed is:

1. A method to monitor a media roll mounted in a printing apparatus, comprising:
scanning with a sensor an end side of a media roll by displacing the sensor in the radial direction of the roll, wherein the sensor is mounted on a media roll support comprising a plate with an opening corresponding with a sensor displacement path,
detecting a position of a media roll outer edge during said scanning, and
determining a number of radial dimensions of the media roll using the detected outer edge position.

2. A method as claimed in claim 1 comprising determining a first radial dimension of the media roll using the detected outer edge position.

3. A method as claimed in claim 2 comprising determining a second radial dimension of the media roll using a media roll core position.

4. A method as claimed in claim 3 comprising detecting the position of the media roll core by scanning with the sensor the end side of the media roll, in the radial direction.

5. A method as claimed in claim 3 further comprising determining the length of media remaining on the media roll.

6. A method as claimed in claim 5 wherein the length of media remaining on the media roll is determined using the first and the second radial dimensions of the media roll and on the thickness of the media.

7. A method as claimed in claim 5 wherein the length of media remaining on the media roll is determined using a previously determined length of media remaining on the media roll and the length of media subsequently advanced through the printing apparatus.

8. A method as claimed in claim 5 comprising comparing the length of media remaining on the media roll with a media length required for a pending print job, and stopping printing and/or generating a warning signal if the length of media remaining on the media roll is less than the length required for the print job.

9. A method as claimed in claim 2, comprising
detecting in a first scanning operation a first position of the media roll outer edge and determining a first radial dimension of the roll using the first position of the media roll outer edge,
advancing a length of media through the printing apparatus,
detecting in a second scanning operation a second position of the media roll outer edge, and determining a second radial dimension of the roll using the second position of the media roll outer edge,
determining the thickness of the media, using the first radial dimension of the roll based on the first position of the media roll outer edge and the second radial dimension of the roll based on the second position of the media roll outer edge and on the length of media advanced between the first and second scanning operations.

10. A device to monitor a media roll mounted in a printing apparatus, the device comprising:
a sensor,
a sensor driving assembly to displace the sensor in the radial direction of the media roll and adjacent one end side of said media roll, and
a sensor control unit connected to the sensor and to the sensor driving assembly, to control displacement and scanning of the sensor and to determine from the sensor output the position of a media roll outer edge, wherein the sensor, the sensor driving assembly and the sensor control unit are mounted on a media roll support comprising a plate with an opening corresponding with a sensor displacement path.

11. A device as claimed in claim 10, wherein the control unit is further adapted to determine a radial dimension of the media roll using the detected outer edge position.

12. A device as claimed in claim 10, wherein the sensor is a line sensor.

13. A device as claimed in claim 12, wherein the line sensor comprises an LED emitter and a photo transistor detector.

14. A device as claimed in claim 10, wherein the sensor and sensor driving assembly are mounted on a media roll support, and the sensor control unit is arranged remote from the media roll support and connected to the sensor and sensor driving assembly by releasable connections.

15. A media roll support comprising a spindle to support a media roll, at least one media roll holder attached to the spindle adjacent an end side of the media roll, the media roll holder comprising a plate having one side facing the media roll and the other side facing away from the media roll, and a monitoring device to monitor the media roll when the roll is mounted on the media roll support, wherein said monitoring device is mounted on the side of the plate facing away from the media roll and comprises a sensor and a sensor driving assembly to scan an end side of a media roll by displacing the sensor in the radial direction of the media roll to determine a dimension of the media roll using a detected outer edge position of the media roll, the plate further comprising an opening in correspondence with a sensor displacement path.

16. A media roll support as claimed in claim 15, wherein said monitoring device further comprises a sensor control unit mounted on the media roll holder and connected to the sensor and to the sensor driving assembly.

17. A media roll support as claimed in claim 15, comprising releasable electric connections to a sensor control unit which is external to the media roll support.

18. A media roll support as claimed in claim 17, wherein the releasable electric connections comprise circumferential conductive tracks provided on one of the spindle or the media roll holder.

* * * * *